United States Patent
Tanaka et al.

(10) Patent No.: US 10,352,302 B2
(45) Date of Patent: Jul. 16, 2019

(54) AIRFLOW GENERATOR POWER SUPPLY AND WIND TURBINE GENERATOR

(71) Applicant: KABUSHIKI KAISHA TOSHIBA, Minato-ku (JP)

(72) Inventors: Motofumi Tanaka, Yokohama (JP); Naohiko Shimura, Atsugi (JP); Toshiki Osako, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/138,555

(22) Filed: Apr. 26, 2016

(65) Prior Publication Data

US 2016/0377060 A1 Dec. 29, 2016

(30) Foreign Application Priority Data

Jun. 23, 2015 (JP) .................................. 2015-125757

(51) Int. Cl.
  *F03D 1/06* (2006.01)
  *F03D 7/02* (2006.01)
  (Continued)

(52) U.S. Cl.
  CPC ............. *F03D 9/25* (2016.05); *F03D 1/0675* (2013.01); *F03D 7/022* (2013.01); *F03D 7/028* (2013.01);
  (Continued)

(58) Field of Classification Search
  CPC ........ Y02E 10/725; Y02E 10/72; Y02E 10/74
  (Continued)

(56) References Cited

U.S. PATENT DOCUMENTS 8,937,799 B2 * 1/2015 Tanaka ...................... F01D 5/14
361/225
2009/0206603 A1 * 8/2009 Llorente Gonzalez ......................
F03D 7/0224
290/44

(Continued)

FOREIGN PATENT DOCUMENTS

CN 1866705 A 11/2006
EP 2 520 800 A1 11/2012
(Continued)

OTHER PUBLICATIONS

Chinese Office Action dated Mar. 5, 2018, in Chinese Patent Application No. 201610082094.0 w/English-language Translation, citing documents AO and AP.
(Continued)

*Primary Examiner* — Charles Reid, Jr.
(74) *Attorney, Agent, or Firm* — Oblon, McClelland, Maier & Neustadt, L.L.P.

(57) ABSTRACT

An airflow generator power supply of an embodiment supplies alternating-current voltage to a plurality of airflow generators on a blade of a wind turbine generator. The power supply has a frequency converter, a plurality of transformers, and a switch. The frequency converter generates alternating-current voltage. Each transformer amplifies the alternating-current voltage and applies the amplified voltage to the corresponding airflow generator. The switch outputs the alternating-current voltage from the frequency converter to one selected from the transformers.

20 Claims, 11 Drawing Sheets

(51) Int. Cl.
  *F03D 9/25* (2016.01)
  *H02K 7/18* (2006.01)
  *H02M 5/44* (2006.01)
  *H02K 11/00* (2016.01)

(52) U.S. Cl.
  CPC ........... *F03D 7/0296* (2013.01); *H02K 7/183* (2013.01); *H02K 11/0094* (2013.01); *H02M 5/44* (2013.01); *F05B 2220/7064* (2013.01); *F05B 2240/30* (2013.01); *F05B 2260/96* (2013.01); *F05B 2270/1033* (2013.01); *Y02E 10/721* (2013.01); *Y02E 10/723* (2013.01); *Y02E 10/725* (2013.01)

(58) Field of Classification Search
  USPC ..................................................... 290/55, 44
  See application file for complete search history.

(56) References Cited

U.S. PATENT DOCUMENTS

| | | | | |
|---|---|---|---|---|
| 2012/0068461 A1* | 3/2012 | Luetze | .................... | F03D 9/003 290/44 |
| 2012/0267892 A1* | 10/2012 | Matsuda | ................. | F03D 7/022 290/44 |
| 2012/0280500 A1* | 11/2012 | Tanaka | .................... | F03D 7/022 290/44 |
| 2012/0287549 A1* | 11/2012 | Tanaka | .................... | F03D 7/022 361/131 |
| 2012/0287550 A1* | 11/2012 | Tanaka | ...................... | F01D 5/14 361/225 |
| 2014/0193256 A1* | 7/2014 | Matsuda | ............... | F03D 1/0675 416/3 |
| 2014/0286789 A1* | 9/2014 | Matsuda | ................. | F03D 7/022 416/90 R |
| 2015/0110651 A1* | 4/2015 | Tanaka | ...................... | F01D 5/14 417/411 |

FOREIGN PATENT DOCUMENTS

| | | |
|---|---|---|
| EP | 2 522 852 A1 | 11/2012 |
| JP | 2008-25434 | 2/2008 |
| JP | 2012-249510 | 12/2012 |

OTHER PUBLICATIONS

Extended European Search Report dated Nov. 22, 2016 in Patent Application No. 16168778.5.

* cited by examiner

AIRFLOW GENERATOR POWER SUPPLY AND WIND TURBINE GENERATOR

CROSS REFERENCE TO RELATED APPLICATION

This application is based upon and claims the benefit of priority from Japanese Patent Application No. 2015-125757, filed on Jun. 23, 2015; the entire contents of which are incorporated herein by reference.

FIELD

Embodiments described herein relate generally to an airflow generator power supply and wind turbine generator.

BACKGROUND

In a wind turbine generator, a power generation efficiency sometimes deteriorates due to change of a wind power or a wind direction. Further, in the wind turbine generator, noise sometimes occurs at a time of generation. The wind turbine generator having airflow generator on its blades is studied to suppress such deterioration of the power generation efficiency and occurrence of noise. The airflow generator has a pair of electrodes sandwiching a dielectric, and generates a plasma airflow by applying alternating-current voltage to the pair of electrodes. The plasma airflow suppresses deterioration of the power generation efficiency and occurrence of noise in the wind turbine generator.

FIG. 13 shows a conventional wind turbine generator. The wind turbine generator 100 has a plurality of airflow generators 120 on blades 110. Normally, the wind turbine generator 100 has airflow generator power supplies 130, each airflow generator power supply 130 corresponds to a different airflow generator 120.

The airflow generator power supply 130 has a frequency converter 131 and a transformer 132. The frequency converter 131 converts a frequency of alternating-current voltage inputted from a not-shown external power supply into a frequency optimal for the airflow generator 120. The transformer 132 converts a voltage value of alternating-current voltage inputted from the frequency converter 131 into a voltage value optimal for the airflow generator 120.

Enlarging the blade 110 can improve a power generation efficiency of the wind turbine generator 100. However, enlargement of the blade 110 will increase the number of the airflow generators 120, resulting in increasing the number of the airflow generator power supplies 130. The wind turbine generator 100 is demanded to miniaturize the airflow generator power supply 130, since an installation location and an installation area of the airflow generator power supply 130 are limited.

DETAILED DESCRIPTION

An airflow generator power supply of an embodiment supplies alternating-current voltage to a plurality of airflow generators on a blade of a wind turbine generator. The airflow generator power supply of the embodiment has a frequency converter, a plurality of transformers, and a switch. The frequency converter generates alternating-current voltage. Each transformer amplifies the alternating-current voltage and applies the amplified voltage to the corresponding airflow generator. The switch outputs the alternating-current voltage from the frequency converter to one selected from the transformers.

First Embodiment

Figure 1:
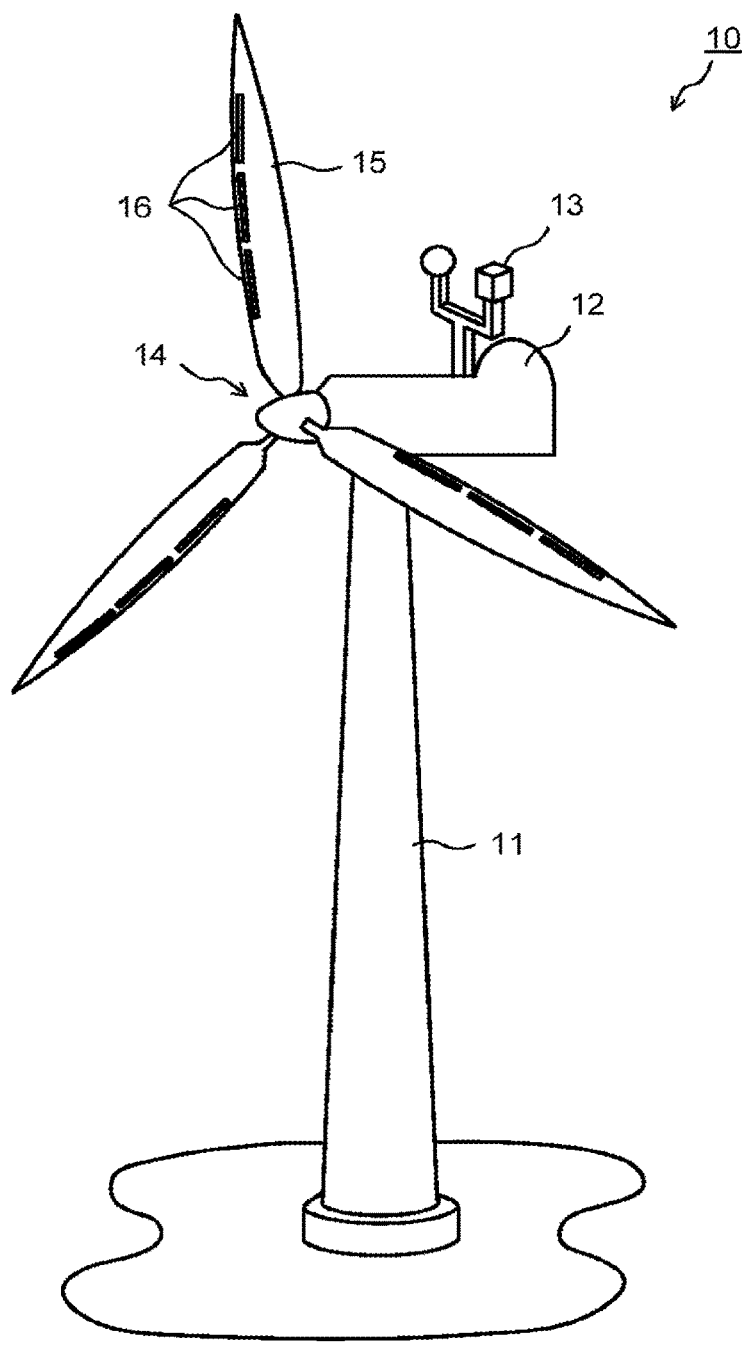
FIG. 1 is a perspective view showing a wind turbine generator in a first embodiment.
Figure 2:
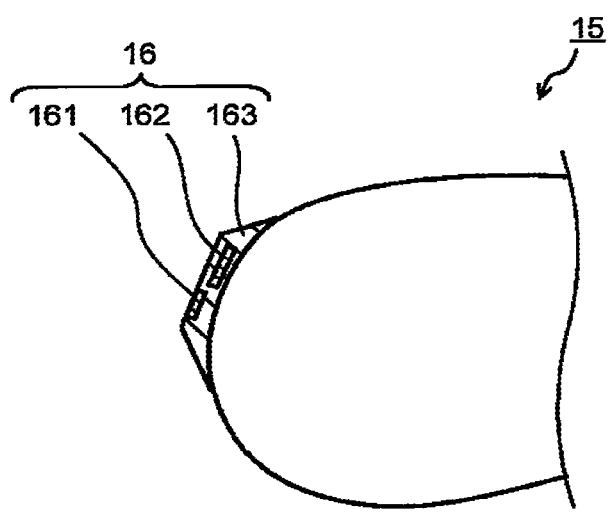
FIG. 2 is a cross-sectional view showing an airflow generator in the first embodiment.
Figure 3:
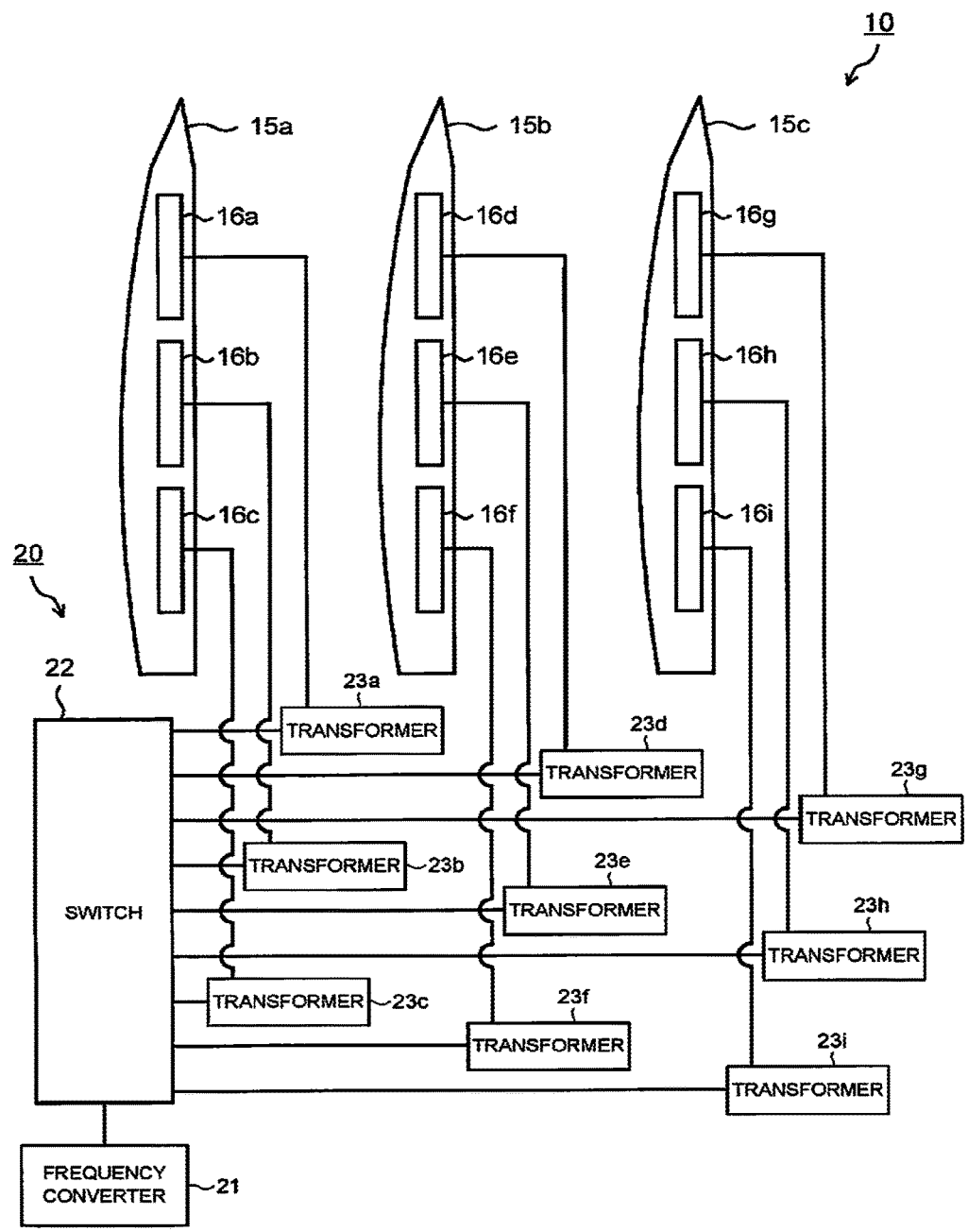
FIG. 3 is a diagram showing an airflow generator power supply in the first embodiment.
Figure 4:
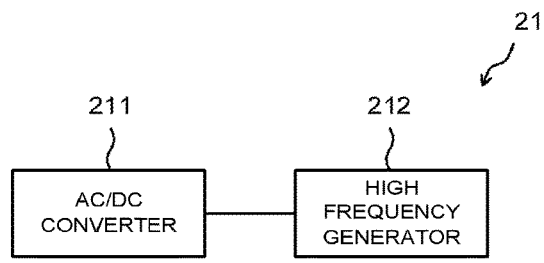
FIG. 4 is a diagram showing a frequency converter in the first embodiment.
Figure 5:
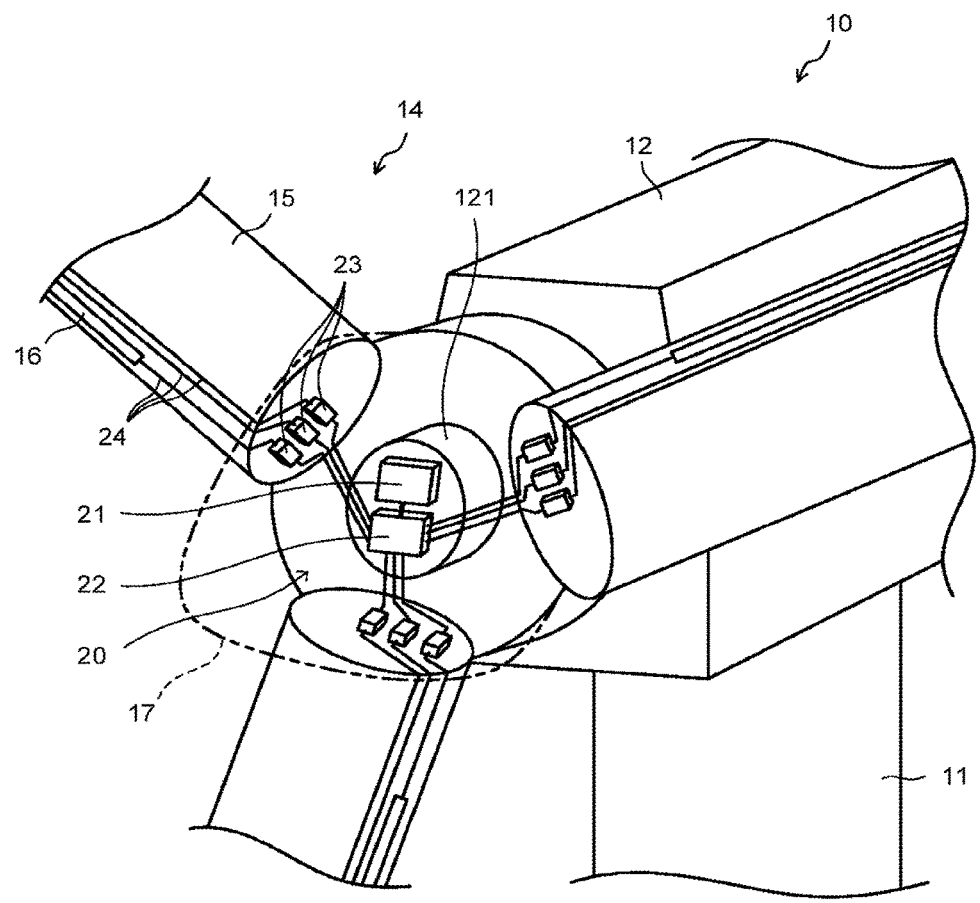
FIG. 5 is a diagram showing a method for mounting the airflow generator power supply in the first embodiment.
Figure 6:
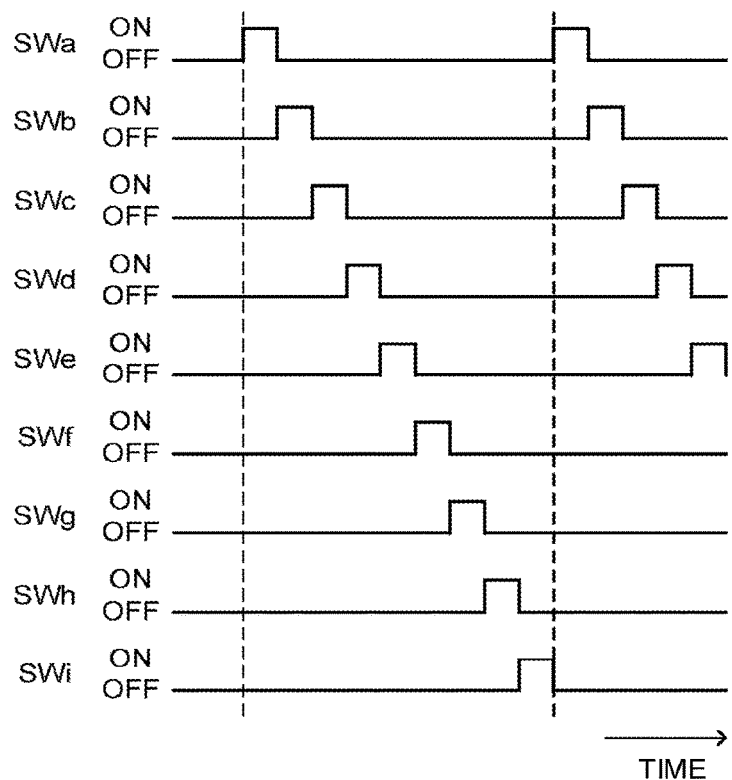
FIG. 6 is a diagram showing a timing chart of a switch in the first embodiment.
Figure 7:
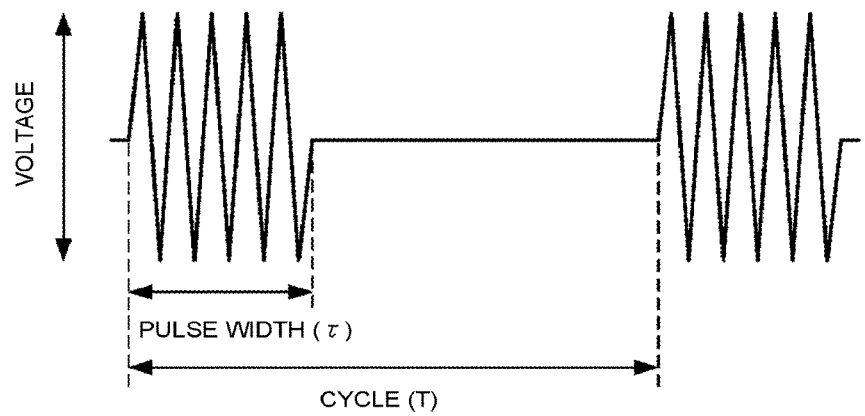
FIG. 7 is a diagram showing a state of alternating-current voltage applied to the airflow generator in the first embodiment.

FIG. 1 is a perspective view showing a wind turbine generator. FIG. 2 is a cross-sectional view showing an airflow generator. FIG. 3 is a diagram showing an airflow generator power supply. FIG. 4 is a diagram showing a frequency converter. FIG. 5 is a diagram showing a method for mounting the airflow generator power supply. FIG. 6 is a diagram showing a timing chart of a switch. FIG. 7 is a diagram showing a state of alternating-current voltage applied to the airflow generator.

As shown in FIG. 1, the wind turbine generator 10 has a tower 11 installed on the ground. A nacelle 12 housing a generator is disposed in a top portion of the tower 11. An aerovane 13 for measuring a wind direction or a speed of wind is disposed in an upper portion of the nacelle 12.

A rotor 14 is provided on a windward side of the nacelle 12. The rotor 14 has three blades 15. The blades 15 are supported by a rotary shaft 121 (FIG. 5) of the generator, the rotary shaft 121 projects from the nacelle 12. Three airflow generators 16 are provided in a front edge of the blades 15, from a blade tip to a blade root.

As shown in FIG. 2, the airflow generator 16 has a first electrode 161, a second electrode 162 disposed apart from the first electrode 161, and a dielectric 163 at least disposed therebetween. A dielectric material of the dielectric 163 is properly selected from known dielectric materials in a solid state in compliance with usage environment or the like. The airflow generator 16 generates a plasma airflow flowing from a first electrode 161 side to a second electrode 162 side by applying alternating-current voltage to the first electrode 161 and the second electrode 162.

As shown in FIG. 3, an airflow generator power supply 20 has a frequency converter 21, a switch 22, and a transformer 23.

One frequency converter 21 is provided in the wind turbine generator 10. The frequency converter 21, into which alternating-current voltage is inputted from an external power supply disposed outside the wind turbine generator 10, modulates a frequency of the alternating-current voltage into a frequency optimal for the airflow generator 16. Normally, the frequency converter 21 outputs alternating-current voltage having a frequency higher than the frequency of alternating-current voltage inputted from the external power supply. The waveform of the alternating-current voltage outputted from the frequency converter 21 can be a pulsed waveform such as of positive polarity, of negative polarity, and bipolar of positive and negative polarities, a sinusoidal waveform, or an intermittent sinusoidal waveform, and the waveform is not limited in particular. Preferably, the frequency converter 21 can change a frequency of alternating-current voltage to output at any time.

As shown in FIG. 4, the frequency converter 21 converts the inputted alternating-current voltage into alternating-current voltage of a higher frequency. The frequency converter 21 has an AC/DC convertor 211 and a high frequency generator 212 (inverter), for example.

The AC/DC convertor 211 converts alternating-current voltage (AC) into direct-current voltage (DC). In the AC/DC convertor, the alternating-current voltage (AC) is converted into the direct-current voltage (DC) by a not-shown diode or the like.

The high frequency generator 212 receives the direct-current voltage converted by the AC/DC convertor 211 and outputs alternating-current voltage having a frequency higher than the frequency of the alternating-current voltage inputted from the external power supply. The alternating-current voltage is generated by switching of IGBT (insulated gate bipolar transistor), an FET (field-effect transistor), or the like, for example. The frequency of the alternating-current voltage is normally preferable to be about 1 to 20 kHz.

Each of the transformer 23 is provided for the corresponding airflow generator 16. More specifically, the transformers 23a, 23b, 23c are provided for the airflow generators 16a, 16b, 16c of the blade 15a. Similarly, the transformers 23d, 23e, 23f are provided for the airflow generators 16d, 16e, 16f of the blade 15b, and the transformers 23g, 23h, 23i are provided for the airflow generators 16g, 16h, 16i of the blade 15c.

The transformer 23 receives the alternating-current voltage generated by the frequency converter 21, and outputs alternating-current voltage having a voltage value higher than the inputted alternating-current voltage. The voltage value of the outputted alternating-current voltage is normally preferable to be several kV.

The frequency converter 21 and the transformers 23 are connected via the switch 22. One switch 22 is provided in the wind turbine generator 10 and outputs the alternating-current voltage inputted from the frequency converter 21 to the specific transformer 23 selected from the transformers 23.

The switch 22 has switch elements of which the number is the same as the number of the transformers 23, for example, and controls continuity between the frequency converter 21 and the individual transformers 23 separately. Such a switch 22 can adjust a time during which the alternating-current voltage is applied to the individual airflow generators 16 and a cycle at which the alternating-current voltage is applied, thus can effectively drive the individual airflow generators. The switch element can be controlled by a controller built in the switch 22, for example.

As shown in FIG. 5, the airflow generator power supply 20 is provided inside a nose cone 17, for example. The frequency converter 21 and the switch 22 are provided in an end of the rotary shaft 121 of the power generator, for example. The transformer 23 is provided in an end surface on a blade root side of the blade 15, for example. The blade 15 has transformers 23 of which the number is the same as the number of the airflow generators 16, for example.

The frequency converter 21 and the switch 22 as well as the switch 22 and the transformer 23 are connected by connection induction wires 24. The alternating-current voltage is supplied to the frequency converter 21 from the external power supply disposed outside the wind turbine generator 10 by a not-shown connection inductive wire. The alternating-current voltage is transmitted between a rotation portion and a non-rotation portion (for example, between the rotary shaft 121 of the power generator and portions other than the rotary shaft 121 in the wind turbine generator 10) via a sliding-type connector such as a slip ring, for example.

The airflow generator power supply 20 in the rotation portion such as a nose cone 17 of the wind turbine generator 10 can suppress application of alternating-current voltage with a high frequency and a high voltage to the sliding-type connector. Thereby, the alternating-current voltage is applied to the airflow generator 16 stably, and occurrence of noise is also suppressed.

Note that the airflow generator power supply 20 may be provided outside the nose cone 17, for example, inside or outside the blade 15. Further, the airflow generator power supply 20 is preferable to be provided in the rotation portion such as a blade 15 and a nose cone 17, but components other than the transformer 23 (that is, the frequency converter 21 and the switch 22) may be provided in other than the rotation portion. When the transformer 23 is provided in the rotation portion, alternating-current voltage having a high voltage is not applied to the sliding type connector, so that the alternating-current voltage is applied to the airflow generator 16 stably and occurrence of noise is suppressed.

FIG. 6 is a diagram showing a timing chart of the switch 22. Note that switch elements SWa to SWi are built in the switch 22, the transformer 23a being connected to the switch element SWa, the transformer 23b being connected to the switch element SWb, and similarly hereinafter, the transformers 23c to 23i being connected to the switch elements SWc to SWi.

The switch elements SWa to SWi are made to be in ON states in this order, for example. After the switch element SWi is made to be in the ON state, the switch elements SWa to SWi are made to be in the ON states again in this order. As a result that the transformers 23 continued to the frequency converter 21 are switched as above, the alternating-current voltage is outputted to all the transformers 23 by one frequency converter 21. In other words, the alternating-current voltage is applied to all the airflow generators 16 by one frequency converter 21.

FIG. 7 shows a state of the alternating-current voltage applied to the airflow generator 16. The alternating-current voltage is applied to the airflow generator 16 cyclically in a pulsed way. A ratio (duty ratio, τ/T) of a pulse width (τ) being a time during which the alternating-current voltage is actually applied to a cycle (T) at which the alternating-current voltage is applied is about 1 to 5%.

Since the duty ratio is about 1 to 5%, the time during which the frequency converter 21 actually applies the alternating-current voltage to the individual airflow generators 16 is short. Under the circumstances, switching the transformers 23 continued to the frequency converter 21 can make one frequency converter 21 to output the alternating-current voltage to all the transformers 23, consequently to apply the alternating-current voltage to all the airflow generators 16.

It is preferable that alternating-current voltage of an optimal frequency (F) is applied to the airflow generator 16. The optimal frequency (F) is obtained by a formula (1) below.

$$F = St \times (2\pi n/60) \times (Rn/Cn) \tag{1}$$

In the formula, "St" indicates a Strouhal number, "n" indicates a rotation number (rpm), "Rn" indicates a representative radius, and "Cn" indicates a representative chord length. The representative radius (Rn) is a representative radius of the airflow generator 16. The representative chord length (Cn) is a chord length of the blade 15 in the representative radius (Rn).

As is obvious from the formula (1), the frequency (F) of the alternating-current voltage changes depending on the representative radius (Rn) and the representative chord length (Cn). In other words, the frequency (F) of the alternating-current voltage changes depending on a position of the airflow generator 16, particularly a position in a longitudinal direction of the blade 15. Therefore, it is preferable that the frequency converter 21 alters a frequency of alternating-current voltage to output in time with switching of the switch 22, particularly switching at a time that the position (position in the longitudinal direction of the blade 15) of the airflow generator 16 being a continued object changes.

For example, in what is shown in FIG. 3, when a step of a most outside in the longitudinal direction of the blade 15a is indicated as a first step, the airflow generator 16a of the first step, the airflow generator 16b of a second step, and the airflow generator 16c of a third step are different in position in the longitudinal direction of the blade 15. Therefore, if the alternating-current voltage is to be applied in order of the above, it is preferable to alter the frequency of the alternating-current voltage which the frequency converter 21 generates.

Similarly, in a case where the alternating-current voltage is applied to the airflow generator 16d of a first step, the airflow generator 16e of a second step, the airflow generator 16f of a third step of the blade 15b in order, and also in a case where the alternating-current voltage is applied to the airflow generator 16g of a first step, the airflow generator 16h of a second step, the airflow generator 16i of a third step of the blade 15c in order, it is preferable to change the frequency of the alternating-current voltage which the frequency converter 21 generates.

Note that it is possible to make the frequencies of the alternating-current voltage to be applied to the airflow generators 16a, 16d, 16g of the first step the same. It is because normally the representative radiuses (Rn) and the representative chord lengths (Cn) are the same. Similarly, it is possible to make the frequencies of the alternating-current voltage to be applied to the airflow generators 16b, 16e, 16h of the second step the same, and it is possible to make the frequencies of the alternating-current voltage to be applied to the airflow generators 16c, 16f, 16i of the third step the same.

Figure 8:
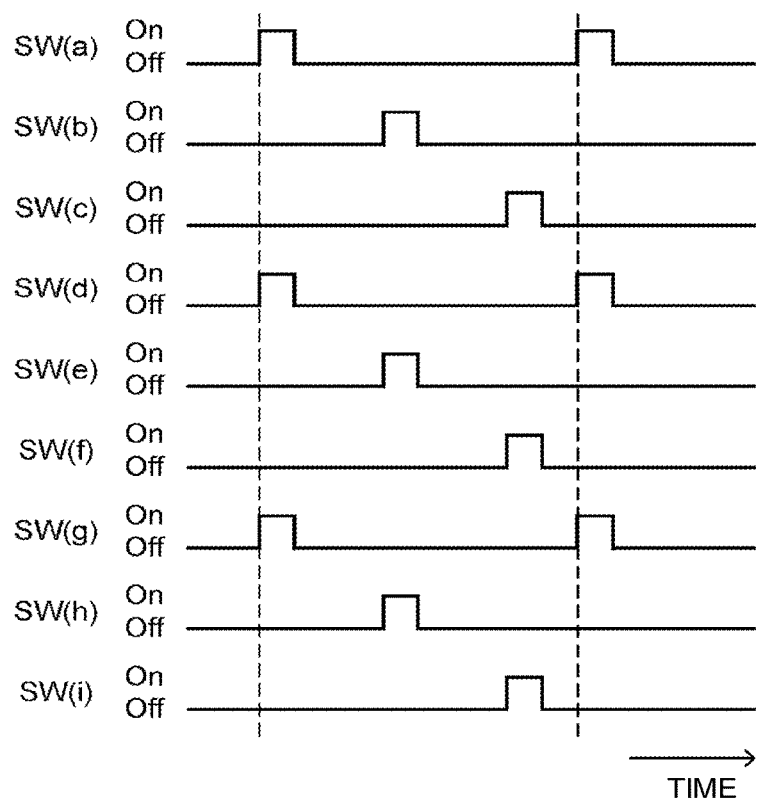
FIG. 8 is a diagram showing another example of the timing chart of the switch in the first embodiment.

The alternating-current voltage may be applied simultaneously to the airflow generators 16 whose frequencies of the alternating-current voltage are the same as described above. For example, as shown in FIG. 8, the switch elements SWa, SWd, SWg corresponding to the airflow generators 16a, 16d, 16g of the first step may be made to be in the ON state simultaneously, and thereafter, the switch elements SWb, SWe, SWh corresponding to the airflow generators 16b, 16e, 16h of the second step may be made to be in the ON states simultaneously, and further the switch elements SWc, SWf, SWi corresponding to the airflow generators 16c, 16f, 16i of the third step may be made to be in the ON state simultaneously.

According to the airflow generator power supply 20 of the first embodiment, since the alternating-current voltage is applied to all the airflow generators 16 by one frequency converter 21, the number of the frequency converters 21 decreases compared with a case where a frequency converter is provided for every airflow generator as in a conventional art. Thereby, the airflow generator power supply 20 is miniaturized.

Note that, in the first embodiment, though a case is described where a unit in which the switch elements SWa to SWi are made to be in the ON state in this order is repeated, the order within the unit of repetition can be altered as necessary. Further, as the unit of repetition, two kinds or more can be adopted. Normally, within the unit of repetition, it is preferable that the switch elements SWa to SWi are made to be in the ON states at least once.

Second Embodiment

Next, a wind turbine generator in a second embodiment will be described.

Note that the wind turbine generator of the second embodiment is different from the wind turbine generator of the first embodiment only in configuration of airflow generator power supply, and thus only an airflow generator power supply will be described.

Figure 9:
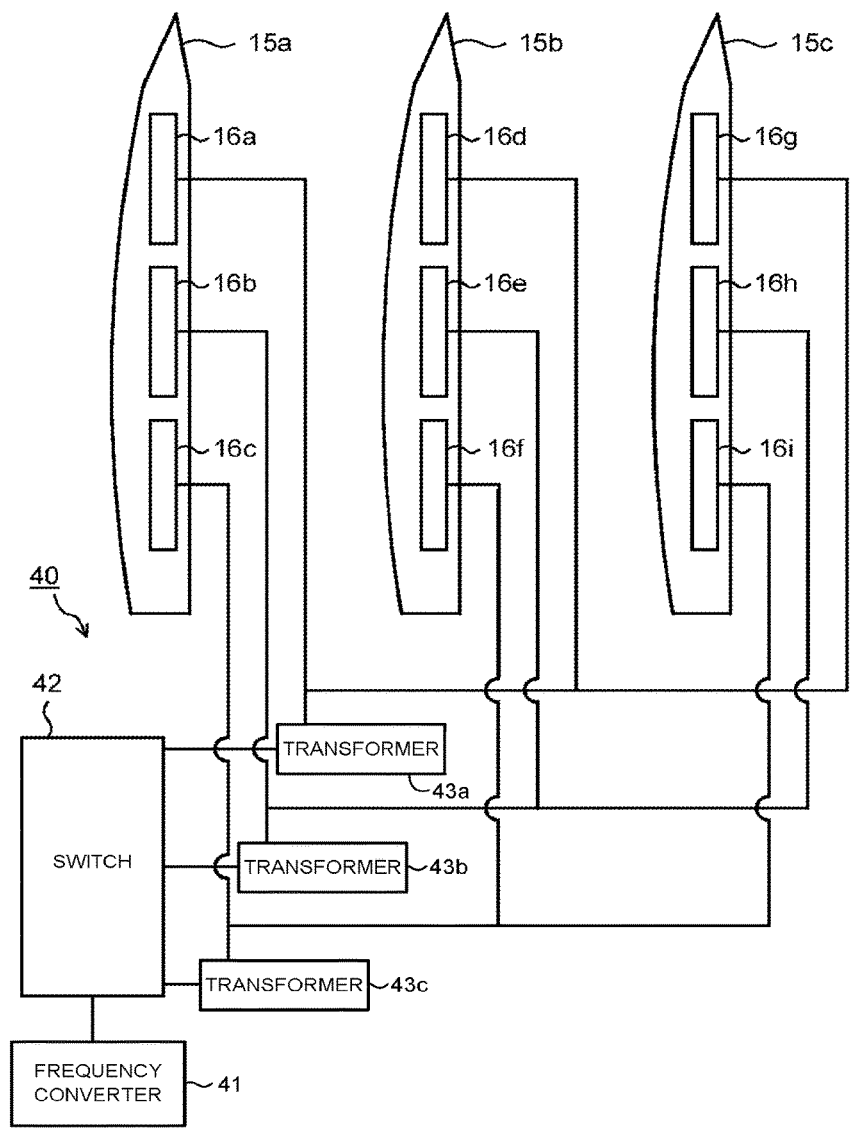
FIG. 9 is a diagram showing an airflow generator power supply in a second embodiment.

FIG. 9 is a diagram showing the airflow generator power supply in the second embodiment.

In the airflow generator power supply 40 in the second embodiment, a transformer 43 is provided for every group constituted by airflow generators 16 whose positions in a longitudinal direction in blades 15 are equal.

More specifically, one transformer 43a is provided for the group of the airflow generators 16 of a first step, that is, the group constituted by the airflow generator 16a of the blade 15a, the airflow generator 16d of the blade 15b, and the airflow generator 16g of the blade 15c.

Similarly, one transformer 43b is provided for the group of the airflow generators 16 of a second step, that is, the group constituted by the airflow generator 16b of the blade 15a, the airflow generator 16e of the blade 15b, and the airflow generator 16h of the blade 15c. Further, one transformer 43c is provided for the group of the airflow generators 16 of a third step, that is, the group constituted by the airflow generator 16c of the blade 15a, the airflow generator 16f of the blade 15b, and the airflow generator 16i of the blade 15c.

For the three transformers 43, one frequency converter 41 and one switch 42 are provided. The switch 42 has the same number of switch elements as the transformer 43 built-in, for example, and controls continuity between the frequency converter 41 and the individual transformers 43 separately.

Figure 10:
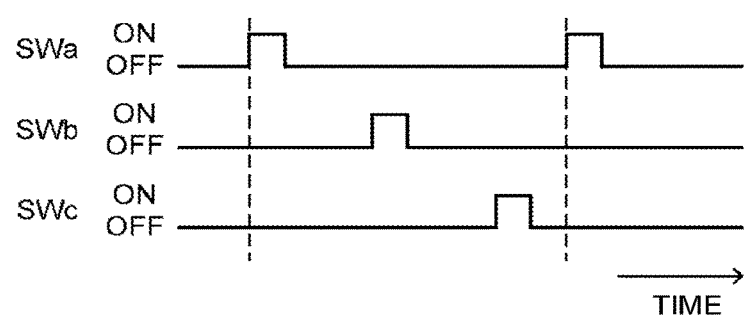
FIG. 10 is a diagram showing a timing chart of a switch in the second embodiment.

FIG. 10 is a diagram showing a timing chart of the switch 42.

Note that the switch elements SWa to SWc are built in the switch 42, the transformer 43a being connected to the switch element SWa, the transformer 43b being connected to the switch element SWb, and the transformer 43c being connected to the switch elements SWc.

The switch elements SWa to SWc are made to be in ON states in this order, for example. After the switch element SWc is made to be in the ON state, the switch elements SWa to SWc are made to be in the ON states again in this order. Since the transformers 43 continued to the frequency converter 41 are switched as above, the alternating-current voltage is outputted to all the transformers 43 by one frequency converter 41. In other words, the alternating-current voltage is applied to all the airflow generators 16 by one frequency converter 41.

According to the airflow generator power supply 40 of the second embodiment, since the transformer 43 is provided for every group constituted by the airflow generators 16 whose positions in the longitudinal direction in the blades 15 are equal, the number of the transformers 43 decreases compared with a case where the transformer is provided for every airflow generator as in a conventional art. Thereby, the airflow generator power supply 40 is miniaturized.

Note that, in the second embodiment, though a case is described where a unit in which the switch elements SWa to SWc are made to be in the ON state in this order is repeated, the order within the unit of repetition can be altered as necessary. Further, as the unit of repetition, two kinds or more can be adopted. Normally, within the unit of repetition, it is preferable that the switch elements SWa to SWc are made to be in the ON states at least once.

Third Embodiment

Next a wind turbine generator in a third embodiment will be described.

Note that the wind turbine generator of the third embodiment is different from the wind turbine generator of the first embodiment only in configuration of airflow generator power supply, and thus only an airflow generator power supply will be described.

Figure 11:
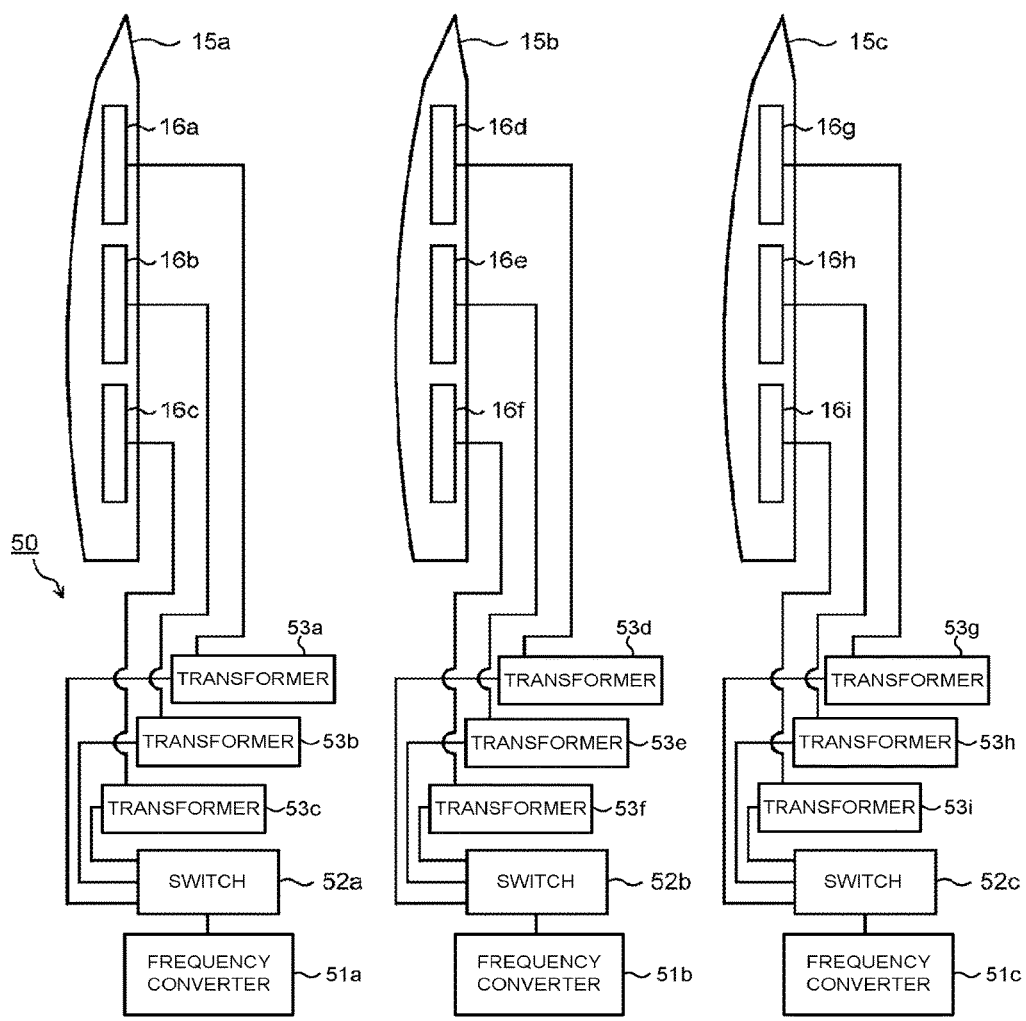
FIG. 11 is a diagram showing an airflow generator power supply in a third embodiment.

FIG. 11 is a diagram showing the airflow generator power supply in the third embodiment.

In the airflow generator power supply 50 in the third embodiment, a transformer 53 is provided for every airflow generator 16. Further, a frequency converter 51 and a switch 52 are provided for every blade 15.

More specifically, for the blade 15a, one frequency converter 51a, one switch 52a, and three transformers 53a, 53b, 53c are provided. Similarly, for the blade 15b, one frequency converter 51b, one switch 52b, and three transformers 53d, 53e, 53f are provided, and for the blade 15c, one frequency converter 51c, one switch 52c, and three transformers 53g, 53h, 53i are provided. Note that the frequency converter 51, the switch 52, and the transformer 53 are not necessarily required to be disposed in the blade itself, and may be disposed in a part other than the blade.

In the individual blades 15, the frequency converter 51 and three transformers 53 are connected via the switch 52. The switch 52 has the same number of switch elements as the transformer 53 built-in, for example, and controls continuity between the frequency converter 51 and the individual transformers 53 separately.

Figure 12:
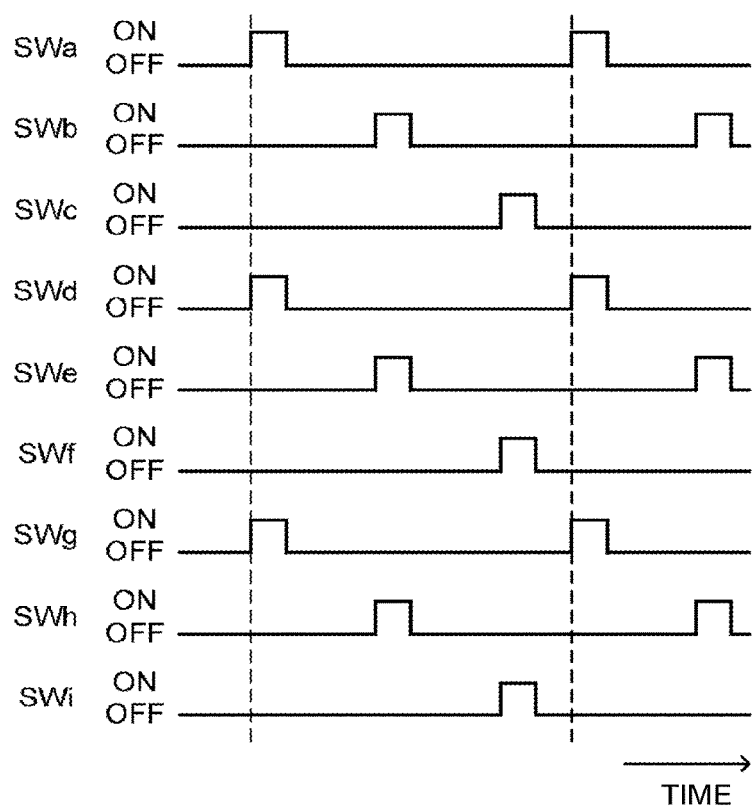
FIG. 12 is a diagram showing a timing chart of a switch in the third embodiment.
Figure 13:
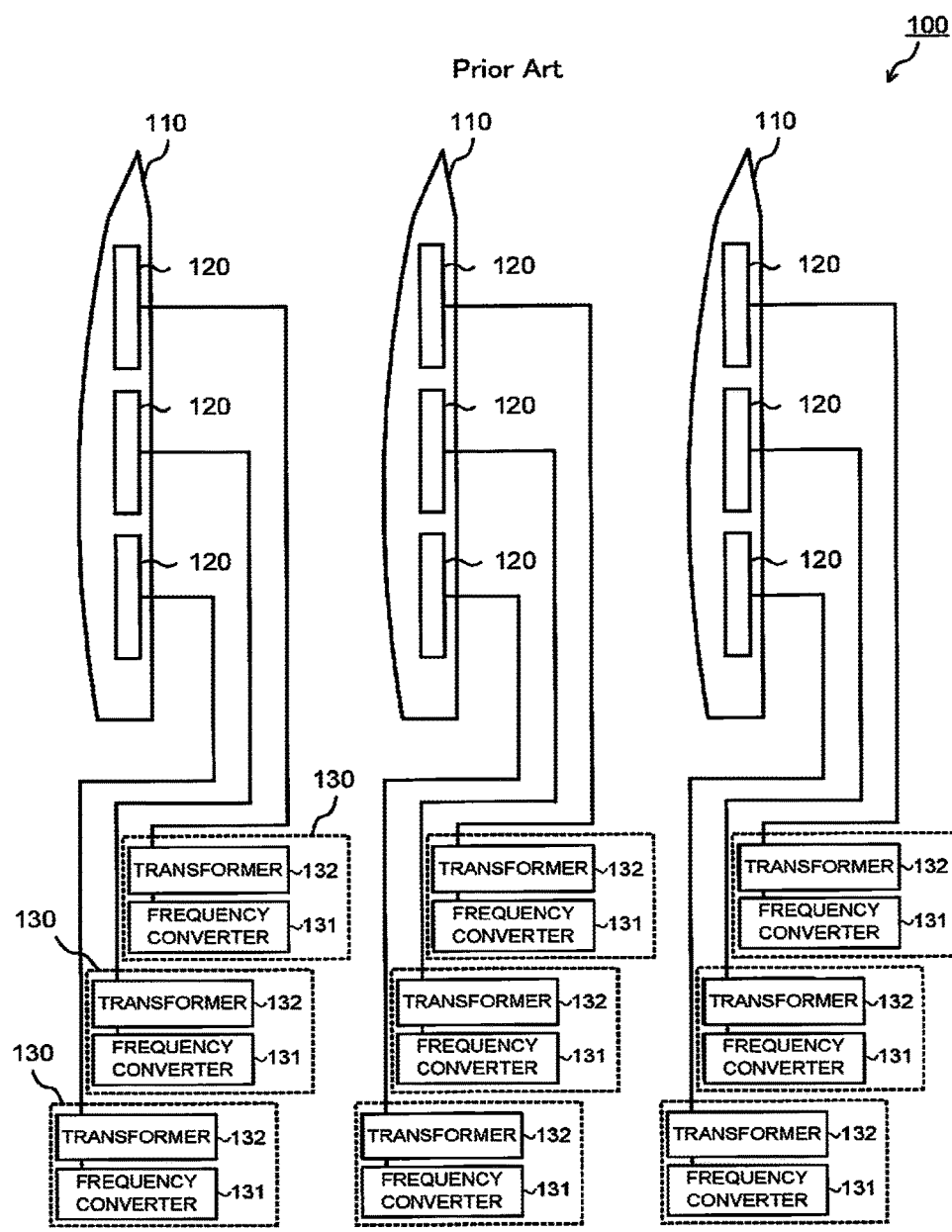
FIG. 13 is a diagram showing a conventional wind turbine generator.

FIG. 12 is a diagram showing a timing chart of the switch 52.

Note that the switch elements SWa to SWc are built in the switch 52a and connected to the transformers 53a to 53c. The switch elements SWd to SWf are built in the switch 52b and the transformers 53d, 53e, 53f are connected thereto. The switch elements SWg, SWh, SWi are built in the switch 52c and the transformers 53g, 53h, 53i are connected thereto.

The switch elements SWa to SWc are made to be in ON states in this order, for example. After the switch element SWc is made to be in the ON state, the switch elements SWa to SWc are made to be in the ON state again in this order. Similarly, the switch elements SWd to SWf are made to be in ON states in this order, for example, and the above is carried out repeatedly. The switch elements SWg to SWi are made to be in ON states in this order, for example, and the above is carried out repeatedly.

According to the airflow generator power supply 50 of the third embodiment, since the frequency converter 51 is provided for every blade 15, the number of the frequency converters 51 decreases compared with a case where a frequency converter is provided for every airflow generator as in a conventional art. Thereby, the airflow generator power supply 50 is miniaturized.

Note that, in the third embodiment, though a case is described where a unit in which the switch elements SWa to SWc are made to be in the ON states in this order, a unit in which the switch elements SWd to SWf are made to be in the ON states in this order, and a unit in which the switch elements SWg to SWi are made to be in the ON states in this order are repeated, the order within the unit of repetition can be altered as necessary, and can be altered independently for each of a group of the switch elements of SWa to SWc, a group of switch elements SWd to SWf, and a group of switch elements of SWg to SWi.

Further, as the unit of repetition, two kinds or more can be adopted. Normally, in the unit of repetition for the switch elements SWa to SWc, it is preferable that the switch elements SWa to SWc are made to be in the ON states at least once, in the unit of repetition for the switch elements SWd to SWf, it is preferable that the switch elements SWd to SWf are made to be in the ON states at least once, and in the unit of repetition for the switch elements SWg to SWi, it is preferable that the switch elements SWg to SWi are made to be in the ON states at least once.

According to at least one of the embodiments described above, by decreasing the number of frequency converters or transformers, an airflow generator power supply can be miniaturized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An airflow generator power supply for supplying alternating-current voltage to a plurality of airflow generators on a blade of a wind turbine generator, the power supply comprising:

a frequency converter to generate a plurality of alternating-current voltages having a plurality of frequencies different from each other;

a plurality of transformers, each configured to amplify the alternating-current voltage to apply the amplified voltage to a corresponding one of the airflow generators; and a switch selectively to apply each of the alternating-current voltages having the different frequencies to a different one of the airflow generators through respective one of the transformers.

2. The power supply according to claim 1,
wherein the frequency converter, the transformers, and the switch are supported by a rotary shaft of the wind turbine generator.

3. The power supply according to claim 1, the wind turbine generator further comprising:
a second blade; and
a plurality of second airflow generators on the second blade.

4. The power supply according to claim 3,
wherein each of the transformers applies the amplified alternating-current voltage to the corresponding one of the airflow generators and a corresponding one of the second airflow generators.

5. The power supply according to claim 3,
wherein each of the airflow generators and a different one of the second airflow generators forms a different group of airflow generators whose distances from a rotary shaft correspond to each other.

6. The power supply according to claim 5,
wherein each of the transformers applies the amplified voltage to the airflow generators in the different group.

7. The power supply according to claim 3, further comprising
a plurality of second transformers, each configured to amplify the alternating-current voltage to apply the amplified voltage to a corresponding one of the second airflow generators,
wherein the switch selectively to apply each of the alternating-current voltages to a different one of the second airflow generators through respective one of the second transformers.

8. The power supply according to claim 3, further comprising:
a second frequency converter to generate a plurality of second alternating-current voltages having a plurality of second frequencies different from each other;
a plurality of second transformers, each configured to amplify the alternating-current voltage from the second frequency converter to apply the amplified voltage to a corresponding one of the second airflow generators; and
a second switch selectively to apply each of the second alternating-current voltages to a different one of the second airflow generators through respective one of the second transformers.

9. A wind turbine generator, comprising:
a generator having a rotary shaft;
a blade connected to the rotary shaft;
a first to a third airflow generator in the blade and configured to generate a first to a third airflow on the blade by alternating-current voltage;
a frequency converter to generate a first alternating-current voltage having a first frequency, a second alternating-current voltage having a second frequency larger than the first frequency, and a third alternating-current voltage having a third frequency larger than the second frequency;
a first transformer electrically connected to the first airflow generator;
a second transformer electrically connected to the second airflow generator;
a third transformer electrically connected to the third airflow generator; and
a switch connected to the frequency converter and selectively to apply the first alternating-current voltage to the first airflow generator through the first transformer, the second alternating-current voltage to the second airflow generator through the second transformer, and the third alternating-current voltage to the third airflow generator through the third transformer.

10. The wind turbine generator according to claim 9,
wherein the frequency converter, the first to third transformers, and the switch are supported by the rotary shaft.

11. The wind turbine generator according to claim 9, further comprising:
a second blade connected to the rotary shaft; and
a fourth to a sixth airflow generator disposed on the second blade.

12. The wind turbine generator according to claim 11,
wherein the first transformer is electrically connected to the first and the fourth airflow generators,
wherein the second transformer is electrically connected to the second and the fifth airflow generators,
wherein the third transformer is electrically connected to the third and the sixth airflow generators.

13. The wind turbine generator according to claim 11,
wherein the first and the fourth airflow generators have first distances from the rotary shaft,
wherein the second and the fifth airflow generators have second distances from the rotary shaft, the second distances are larger than the first distances, and
wherein the third and the sixth airflow generators have third distances from the rotary shaft, the third distances are larger than the second distances.

14. The wind turbine generator according to claim 13,
wherein each of the transformers applies the amplified voltage to the airflow generators in the different group.

15. The wind turbine generator according to claim 11, further comprising:
a fourth transformer electrically connected to the fourth airflow generator;
a fifth transformer electrically connected to the fifth airflow generator; and
a sixth transformer electrically connected to the sixth airflow generator,
wherein the switch selectively to apply the first alternating-current voltage to the first and fourth airflow generators respectively through the first and fourth transformers, the second alternating-current voltage to the second and fifth airflow generator respectively through the second and fifth transformers, and the third alternating-current voltage to the third and sixth airflow generators respectively through the third and sixth transformers.

16. The wind turbine generator according to claim 11, further comprising:
a second frequency converter to generate a fourth alternating-current voltage having a fourth frequency, a fifth alternating-current voltage having a fifth frequency larger than the fourth frequency, and a sixth alternating-current voltage having a sixth frequency larger than the fifth frequency;
a fourth transformer electrically connected to the fourth airflow generator;
a fifth transformer electrically connected to the fifth airflow generator; and a sixth transformer electrically connected to the sixth airflow generator, wherein a second switch selectively to apply the fourth alternating-current voltage to the fourth airflow generator through the fourth transformers, the fifth alternating-current voltage to the fifth airflow generator through the fifth transformers, and the sixth alternating-current voltage to the sixth airflow generator through the sixth transformer.

17. An airflow generator power supply for supplying alternating-current voltage to a first to a third airflow generator on a blade of a wind turbine generator, the power supply comprising:

a frequency converter to generate a first alternating-current voltage having a first frequency, a second alternating-current voltage having a second frequency larger than the first frequency, and a third alternating-current voltage having a third frequency larger than the second frequency;

a first transformer electrically connected to the first airflow generator;

a second transformer electrically connected to the second airflow generator;

a third transformer electrically connected to the third airflow generator; and a switch connected to the frequency converter and being selectively to apply the first alternating-current voltage to the first airflow generator through the first transformer, the second alternating-current voltage to the second airflow generator through the second transformer, and the third alternating-current voltage to the third airflow generator through the third transformer.

18. The power supply according to claim 17, wherein the frequency converter, the first to third transformers, and the switch are supported by a rotary shaft of the wind turbine generator.

19. The power supply according to claim 17, the wind turbine generator further comprising:

a second blade; and a fourth to a sixth airflow generator on the second blade.

20. The power supply according to claim 19, wherein the first and the fourth airflow generators have first distances from the rotary shaft, wherein the second and the fifth airflow generators have second distances from the rotary shaft, the second distances are larger than the first distances, and wherein the third and the sixth airflow generators have third distances from the rotary shaft, the third distances are larger than the second distances.

* * * * *